(12) United States Patent
Peng et al.

(10) Patent No.: US 11,553,048 B2
(45) Date of Patent: Jan. 10, 2023

(54) METHOD AND APPARATUS, COMPUTER DEVICE AND MEDIUM

(71) Applicant: BEIJING BAIDU NETCOM SCIENCE AND TECHNOLOGY CO., LTD., Beijing (CN)

(72) Inventors: Yunpeng Peng, Beijing (CN); Haifeng Wang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 17/824,318

(22) Filed: May 25, 2022

(65) Prior Publication Data

US 2022/0286521 A1 Sep. 8, 2022

Related U.S. Application Data

(63) Continuation of application No. PCT/CN2021/088893, filed on Apr. 22, 2021.

(30) Foreign Application Priority Data

Dec. 28, 2020 (CN) .......................... 202011582545.X

(51) Int. Cl.
*H04L 29/08* (2006.01)
*H04L 67/306* (2022.01)
(Continued)

(52) U.S. Cl.
CPC .......... *H04L 67/306* (2013.01); *G06K 9/6256* (2013.01); *H04L 67/535* (2022.05)

(58) Field of Classification Search
CPC ........................... H04L 67/306; H04L 67/535
(Continued)

(56) References Cited

U.S. PATENT DOCUMENTS

2017/0161062 A1* 6/2017 Banerjee ............. G06F 11/3466
2019/0102802 A1* 4/2019 Tuschman ......... G06Q 30/0204
(Continued)

FOREIGN PATENT DOCUMENTS

CN 106528656 A 3/2017
CN 109255994 A 1/2019
(Continued)

*Primary Examiner* — Adnan M Mirza
(74) *Attorney, Agent, or Firm* — Leydig, Voit & Mayer, Ltd.

(57) ABSTRACT

An object recommendation method, computer device, and medium are provided, relating to the field of artificial intelligence and, particularly, content recommendation. A method includes: obtaining a first user profile of a user, the first user profile being determined based on behavior data of the user over a first historical period of time; using a matching model to determine a recommended object based on the first user profile; recommending the recommended object to the user; obtaining a second user profile of the user, the second user profile being determined based on behavior data of the user over a second historical period of time, and the behavior data of the user over the second historical period of time includes behavior data of the user after the recommended object is recommended to the user; and updating the matching model based on the first user profile, the second user profile, and the recommended object.

18 Claims, 4 Drawing Sheets

(51) Int. Cl.
  *H04L 67/50* (2022.01)
  *G06K 9/62* (2022.01)
(58) Field of Classification Search
  USPC .......................................................... 709/223
  See application file for complete search history.

(56) References Cited

U.S. PATENT DOCUMENTS

2019/0114729 A1   4/2019  Terra et al.
2022/0172260 A1*  6/2022  Yi ..................... G06Q 30/0201

FOREIGN PATENT DOCUMENTS

CN     111915458 A   11/2020
CN     112001656 A   11/2020
CN     112579909 A    3/2021

* cited by examiner

METHOD AND APPARATUS, COMPUTER DEVICE AND MEDIUM

CROSS-REFERENCE TO RELATED APPLICATIONS

This application is a continuation of International Application No. PCT/CN2021/088893, filed on Apr. 22, 2021, which claims priority to the Chinese Patent Application No. 202011582545.X, filed on Dec. 28, 2020. The disclosures of the aforementioned applications are hereby incorporated by reference in their entireties.

TECHNICAL FIELD

The present disclosure relates to the technical field of artificial intelligence, particularly relates to the technical field of content recommendation, and specifically relates to an object recommendation method and apparatus, a computer device, a medium and a program product

BACKGROUND

Artificial intelligence is a subject that studies use of computers to simulate some human thinking processes and intelligent behaviors (such as learning, reasoning, thinking, planning, etc.), and has both hardware-level technology and software-level technology. The artificial intelligence hardware technology generally includes fields such as sensors, dedicated artificial intelligence chips, cloud computing, distributed storage and big data processing, and the artificial intelligence software technology mainly includes several general aspects of the computer vision technology, the speech recognition technology, the natural language processing technology, and machine learning/deep learning, the big data processing technology, the knowledge graph technology, etc. Artificial intelligence is increasingly widely applied in various fields, such as the field of object recommendation.

The methods described in the section are not necessarily the methods that have been previously conceived or adopted. Unless otherwise indicated, it should not be assumed that any of the methods described in the section are considered as the prior art solely because they are included in the section. Similarly, unless otherwise indicated, problems mentioned in the section should not be assumed to have been recognized in any prior art.

SUMMARY

The present disclosure provides an object recommendation method and apparatus, a computer device, a medium, and a program product.

According to an aspect of the present disclosure, an object recommendation method is provided, and includes: obtaining a first user profile of a user, wherein the first user profile is based on behavior data of the user over a first historical period of time; using a matching model to determine a recommended object based on the first user profile; recommending the recommended object to the user; obtaining a second user profile of the user, wherein the second user profile is based on behavior data of the user over a second historical period of time, and the behavior data over the second historical period of time includes behavior data after the recommended object is recommended to the user; and updating the matching model based on the first user profile, the second user profile and the recommended object.

According to another aspect of the present disclosure, a computing device is provided, and includes: a processor, and a memory that stores a program, the program comprising instructions that, when executed by the processor, cause the processor to perform actions including: obtaining a first user profile of a user, wherein the first user profile is based on behavior data of the user over a first historical period of time; using a matching model to determine a recommended object based on the first user profile; recommending the recommended object to the user; obtaining a second user profile of the user, wherein the second user profile is based on behavior data of the user over a second historical period of time, and the behavior data of the user over the second historical period of time comprises behavior data of the user after the recommended object is recommended to the user; and updating the matching model based on the first user profile, the second user profile and the recommended object.

According to another aspect of the present disclosure, a non-transitory computer-readable storage medium is provided, having a computer program stored thereon, wherein the computer program, when executed by a processor, cause the processor to perform actions including: obtaining a first user profile of a user, wherein the first user profile is based on behavior data of the user over a first historical period of time; using a matching model to determine a recommended object based on the first user profile; recommending the recommended object to the user; obtaining a second user profile of the user, wherein the second user profile is based on behavior data of the user over a second historical period of time, and the behavior data of the user over the second historical period of time comprises behavior data of the user after the recommended object is recommended to the user; and updating the matching model based on the first user profile, the second user profile and the recommended object.

According to one or more embodiments of the present disclosure, in the process of object recommendation executed by the matching model, the matching model may be constantly updated according to the recommendation result to promote the matching effect of the matching model.

It should be understood that the content described in the section is not intended to identify key or critical features of embodiments of the present disclosure nor is it intended to limit the scope of the present disclosure. Other features of the present disclosure will become apparent through the following description.

BRIEF DESCRIPTION OF THE DRAWINGS

The accompanying drawings in some embodiments illustrate embodiments and constitute a part of the specification, and together with the written description of the specification, serve to explain example implementations of the embodiments. The illustrated embodiments are merely for illustrative purposes, and do not limit the scope of the claims. In all the drawings, identical reference numerals refer to similar, but not necessarily identical, elements.

DETAILED DESCRIPTION

Figure 1:
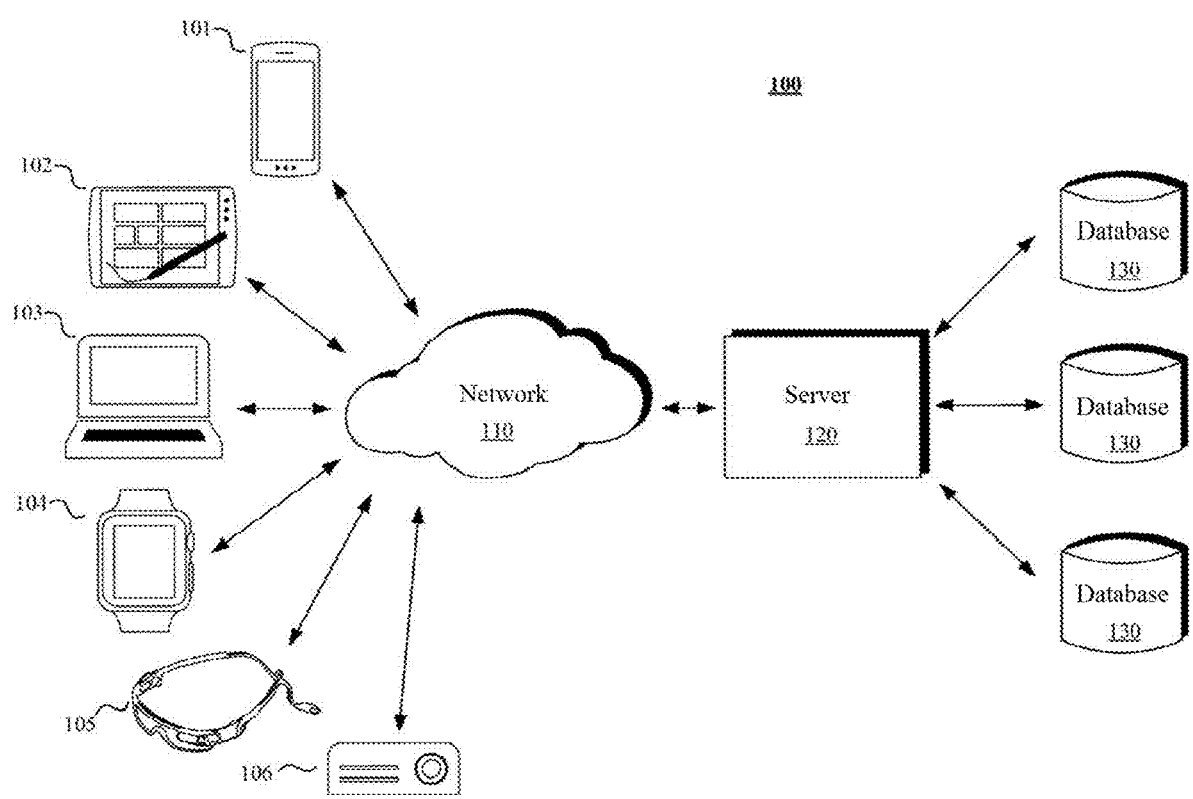
FIG. 1 illustrates a schematic diagram of an example system in which various methods described herein may be implemented according to an embodiment of the present disclosure.

Example embodiments of the present disclosure are described below in combination with the accompanying drawings, wherein various details of embodiments of the present disclosure are included to facilitate understanding, which should be considered merely example. Accordingly, those of ordinary skill in the art should recognize that various changes and modifications can be made to the embodiments described herein without departing from the scope of the present disclosure. Likewise, descriptions of well-known functions and constructions are omitted from the following description for clarity and conciseness.

In the present disclosure, the use of the terms "first", "second", and the like to describe various elements is not intended to define a positional, temporal, or importance relationship of the elements unless otherwise specified, and such terms are merely used to distinguish one component from another component. In some examples, a first element and a second element may refer to the same instance of the element, while in some cases, based on the context description, they may also refer to different instances.

The terms used in the description of the various examples in the present disclosure are for the purpose of describing particular examples only and are not intended to conduct limitation. If the number of elements is not specifically defined, the elements may be one or may also be more unless the context clearly indicates otherwise. Furthermore, the term "and/or" used in the present disclosure encompasses any one of and all possible combinations of the listed items.

As an aspect of the application of the artificial intelligence technology, a computer may be caused to simulate a person's thinking process based on a trained matching model and make targeted recommendations of products, content, services, and other objects for different users. For example, in an information interaction recommendation scenario, training courses, audio, video, etc., that users may be interested in can be recommended for the users; in a commodity purchase recommendation scenario, products that users may be interested in can be recommended to the users; and in a marriage or dating recommendation scenario, people, etc., that users may be interested in can be recommended for the users.

In the related art, once trained, a matching model is applied with fixed parameters in the process of object recommendation. This results in incapability of adjustment on the matching model according to the actual application effect in the process of application of the matching model.

Based on this, the present disclosure provides an object recommendation method and apparatus, a computer device, a medium, and a program product. The method enables the dynamic update of a matching model in the process of application of the matching model to constantly promote the matching effect of the matching model by updating the matching model based on a first user profile before a recommended object is recommended to a user, a second user profile after the recommended object is recommended to the user, and the recommended object.

Embodiments of the present disclosure will be described in detail below in combination with the accompanying drawings.

FIG. 1 illustrates a schematic diagram of an example system 100 in which various methods and apparatuses described herein may be implemented according to an embodiment of the present disclosure. Referring to FIG. 1, the system 100 includes one or more client devices 101, 102, 103, 104, 105 and 106, a server 120, and one or more communication networks 110 coupling the one or more client devices to the server 120. The client devices 101, 102, 103, 104, 105 and 106 can be configured to execute one or more applications.

In an embodiment of the present disclosure, the server 120 may run one or more services or software applications enabling the object recommendation method to be performed.

In certain embodiments, the server 120 may also provide other services or software applications that may include non-virtual environments and virtual environments. In certain embodiments, these services may be provided as web-based or cloud services, for example provided to users of the client devices 101, 102, 103, 104, 105, and/or 106 under a Software as a Service (SaaS) model.

In the configuration illustrated in FIG. 1, the server 120 may include one or more components implementing the functions performed by the server 120. These components may include software components, hardware components, or a combination thereof executable by one or more processors. Users operating the client devices 101, 102, 103, 104, 105, and/or 106 may in turn utilize one or more client applications to interact with the server 120 to utilize the services provided by these components. It should be understood that various different system configurations are possible, which may be different from the system 100. Accordingly, FIG. 1 is an example of a system for implementing various methods described herein and is not intended to conduct limitation.

A user may use the client devices 101, 102, 103, 104, 105, and/or 106 to obtain a first and/or second user profiles, and recommend a recommended object to the user. The client device may provide an interface that enables a user of the client device to interact with the client device. The client device may also output information to the user via the interface. Although FIG. 1 depicts only six client devices, those skilled in the art will be able to understand that any number of client devices may be supported by the present disclosure.

The client devices 101, 102, 103, 104, 105, and/or 106 may include various types of computer devices, such as portable handheld devices, general purpose computers such as personal computers and laptop computers, workstation computers, wearable devices, gaming systems, thin clients, various messaging devices, sensors or other sensing devices. These computer devices may run various types and versions of software applications and operating systems, such as Microsoft Windows, Apple iOS, UNIX-like operating systems, Linux, or Linux-like operating systems (e.g., Google Chrome OS), or include various mobile operating systems such as Microsoft Windows Mobile OS, iOS, Windows Phone, and Android. The portable handheld devices may include a cellular phone, a smartphone, a tablet computer, a Personal Digital Assistant (PDA), or the like. The wearable devices may include head-mounted displays and other devices. The gaming systems may include various handheld gaming devices, Internet enabled gaming devices, or the like. The client devices can execute a variety of different applications, such as a variety of Internet-related applications, communication applications (e.g., email applications), and Short Message Service (SMS) applications, and may use a variety of communication protocols.

The network 110 may be any type of network well known to those skilled in the art, which can support data communications using any one of a variety of available protocols (including but not limited to TCP/IP, SNA, IPX, and the like). As an example only, the one or more networks 110 can be a Local Area Network (LAN), a network based on Ethernet, a token ring, a Wide Area Network (WAN), the Internet, a virtual network, a Virtual Private Network (VPN), an intranet, an extranet, a Public Switched Telephone Network (PSTN), an infrared network, a wireless network (e.g., Bluetooth, WIFI), and/or any combination of these and/or other networks.

The server 120 may include one or more general purpose computers, dedicated server computers (e.g., PC (personal computer) servers, UNIX servers, mid-range servers), blade servers, mainframe computers, server clusters, or any other appropriate arrangement and/or combination. The server 120 may include one or more virtual machines running virtual operating systems, or other calculating architecture involving virtualization (e.g., one or more flexible pools of logical storage devices that can be virtualized to maintain the virtual storage devices of the server). In various embodiments, the server 120 may run one or more services or software applications that provide functions described below.

Calculation units in the server 120 may run one or more operating systems including any of the above operating systems as well as any of commercially available server operating systems. The server 120 may also run any one of various additional server applications and/or mid-tier applications, including HTTP servers, FTP servers, CGI servers, JAVA servers, database servers, and the like.

In some implementations, the server 120 may include one or more applications to analyze and merge data feeds and/or event updates received from the users of the client devices 101, 102, 103, 104, 105, and 106. The server 120 may also include one or more applications to display the data feeds and/or real-time events via one or more display devices of the client devices 101, 102, 103, 104, 105, and 106.

In some implementations, the server 120 may be a server of a distributed system, or a server combined with a blockchain. The server 120 may also be a cloud server, or an intelligent cloud computing server or an intelligent cloud host with the artificial intelligence technology. The cloud server is a host product in a cloud computing service system to address the defects of high management difficulty and weak business scalability present in services of a traditional physical host and a Virtual Private Server (VPS).

The system 100 may also include one or more databases 130. In certain embodiments, these databases may be used to store data and other information. For example, one or more of the databases 130 may be used to store information such as audio files and video files. databases 130 may reside in various locations. For example, a databases used by the server 120 may be local to the server 120 or may be remote from the server 120 and may be in communication with the server 120 via a network-based or dedicated connection. The databases 130 may be of different types. In certain embodiments, the databases used by the server 120 may be a database, such as a relational database. One or more of these databases may store, update, and retrieve data to and from the databases in response to commands.

In certain embodiments, one or more of databases 130 may also be used by applications to store application data. The databases used by the applications may be different types of databases, such as a key-value store, an object store, or a conventional store supported by a file system.

The system 100 of FIG. 1 may be configured and operated in various ways to enable application of the various methods and apparatuses described according to the present disclosure.

Figure 2:
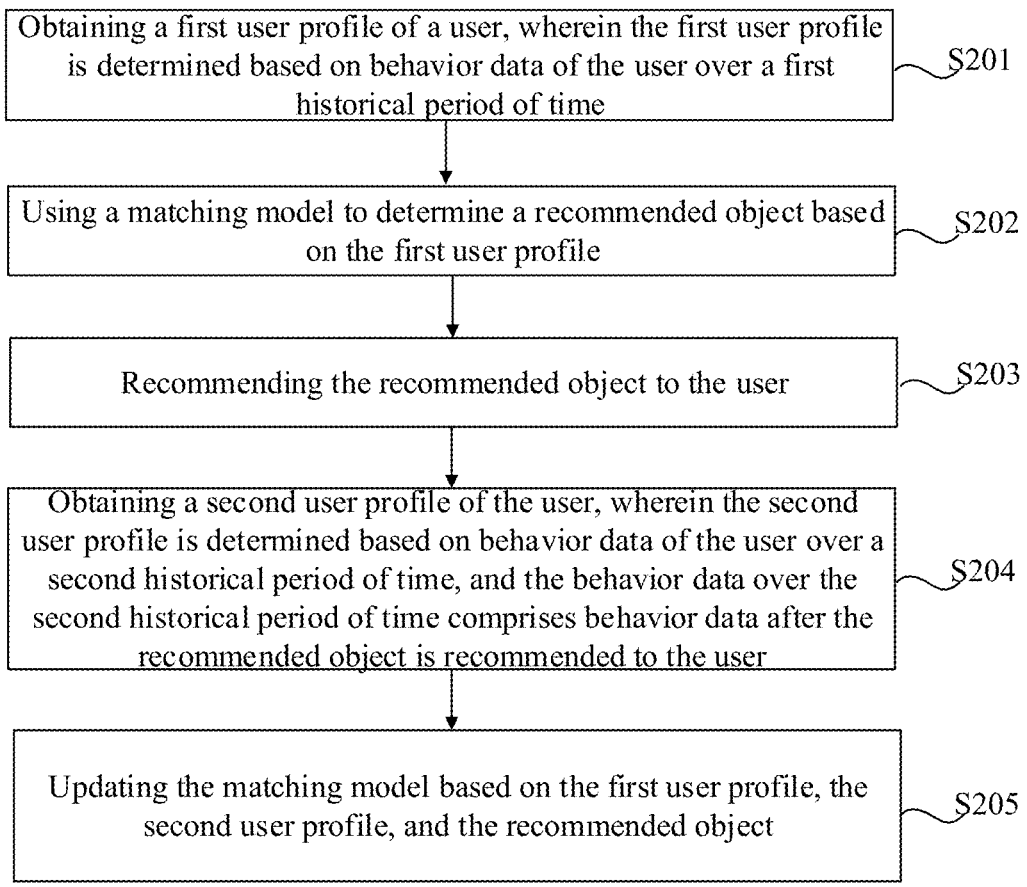
FIG. 2 is a flowchart illustrating an object recommendation method according to an example embodiment of the present disclosure.

FIG. 2 is a flowchart illustrating an object recommendation method according to an example embodiment of the present disclosure. As shown in FIG. 2, the method may include: a step S201, obtaining a first user profile of a user, wherein the first user profile is determined based on behavior data of the user over a first historical period of time; a step S202, using a matching model to determine a recommended object based on the first user profile; a step S203, recommending the recommended object to the user; a step S204, obtaining a second user profile of the user, wherein the second user profile is determined based on behavior data of the user over a second historical period of time, and the behavior data over the second historical period of time includes behavior data after the recommended object is recommended to the user; and a step S205, updating the matching model based on the first user profile, the second user profile and the recommended object. The updated matching model may be used to perform subsequent object recommendation. Dynamic update of the matching model in the process of application of the matching model is thereby achieved, thus constantly promoting the matching effect of the matching model.

For the step S201, the first user profile may be determined based on the behavior data of the user over the first historical period of time. Optionally, the behavior data may include one or more behaviors of the user over the first historical period of time, for example, one or more of click, upload, download, browse, evaluation, or scoring, as well as the content data for which the user behavior is directed.

In an implementation manner, the first user profile may be jointly determined by user attribute data and the user's behavior data over the first historical period of time. Optionally, the user attribute data may include age, gender, occupation, position, etc., of the user.

In an implementation manner, an executive body for performing the object recommendation method may acquire behavior data and/or attribute data of the user by means of a limited connection or a wireless connection. Optionally, the above behavior data and/or attribute data may be automatically collected by the executive body or may also be uploaded by the user, which is not limited herein.

According to some embodiments, the first user profile may include one or more user characteristics and one or more first evaluation values respectively corresponding thereto. Thus, via the one or more user characteristics contained in the first user profile and the one or more first evaluation values respectively corresponding thereto, evaluation of the user on the user characteristics in multiple different dimensions can be achieved based on actual needs. For example, a smaller first evaluation value may represent a lower evaluation, and vice versa.

In an implementation manner, one or more user characteristics included in the first user profile may be preset according to actual needs.

For example, based on the need of evaluation on student's learning ability, a user profile of a student can be set up, including 5 user characteristics of Chinese, mathematics, English, history, geography, politics, etc., and the learning ability of the student on each user characteristic can be evaluated by a first evaluation value corresponding to each user characteristic.

According to some embodiments, the executive body may respectively calculate a first evaluation value of each user characteristic of the one or more user characteristics included in the first user profile based on the acquired behavior data of the user over the first historical period of time, or the user attribute data and the behavior data of the user over the first historical period of time.

Understandably, the first evaluation value of each user characteristic of the user characteristics may be calculated by a predetermined rule, or the first evaluation value may also be calculated by various machine learning models including neural networks, which is not limited herein.

For the step S202, the matching model is used to determine the recommended object based on the first user profile.

According to some embodiments, using the matching model to determine the recommended object based on the first user profile may include: determining a matching value of each selectable object of a plurality of selectable objects and the first user profile respectively by using the matching model; and determining at least one of the plurality of selectable objects as the recommended object for the first user profile based on the matching value of each selectable object and the first user profile. Thus, a matching degree for each selectable object can be quantified, and then, by quantifying the obtained matching values, one or more of selectable objects with higher matching values in the plurality of selectable objects can be determined as recommended objects.

According to some embodiments, the matching model may include a relevance model, and determining the matching value of each selectable object of the plurality of selectable objects and the first user profile respectively by using the matching model may include: determining at least one user characteristic in the first user profile as a first target user characteristic; and for each selectable object of the plurality of selectable objects, determining a relevance value of the selectable object and the first target user characteristic by using the relevance model, and determining the relevance value as a matching value of the selectable object and the first user profile. Thus, by determining at least one user characteristic in the first user profile as the first target user characteristic for matching, a targeted recommendation of a part of the user characteristics in the first user profile can be achieved, thus improving the accuracy of recommendation.

In an implementation manner, the first target user characteristic may include any one or more user characteristics to be improved in the first user profile.

In an implementation manner, the relevance model may determine a relevance value between the first target user characteristic and each selectable object through computational rules based on similarity matching and/or semantic matching.

In an implementation manner, the relevance model may include a calculation module and a correction module, wherein the calculation module can calculate an initial relevance value l between the first target user characteristic and each selectable object by means of similarity matching and/or semantic matching, and a correction constant m is stored in the correction module. The relevance model can determine a relevance value q of the selectable object and the first target user characteristic by the initial relevance value l calculated by the calculation module and the correction constant m stored in the correction module.

$$q = l + \mu m$$

Wherein, $\mu$ denotes a correction coefficient of the relevance model, $-1 \leq \mu \leq 1$. The value of $\mu$ may be updated according to the recommended effect in the process of application of the relevance model.

According to some embodiments, determining at least one user characteristic in the first user profile as the first target user characteristic may include: determining a user characteristic to which a minimum value of the one or more first evaluation values in the first user profile corresponds as the first target user characteristic. Thus, targeted recommendation of a shortcoming characteristic in the first user profile can be achieved for the shortcoming characteristic in the one or more user characteristics in the first user profile.

According to some embodiments, determining the matching value of each selectable object of the plurality of selectable objects and the first user profile respectively by using the matching model may include: determining at least one user characteristic in the first user profile as a second target user characteristic; constructing a user characteristic vector based on at least one first evaluation value corresponding to the second target user characteristic; and for each selectable object of the plurality of selectable objects, in response to the user characteristic vector being input to the matching model, outputting a matching value of the selectable object and the first user profile by the matching model. Thus, the matching value of the first user profile and each selectable object can be calculated by the machine learning model.

According to some embodiments, determining at least one user characteristic in the first user profile as the second target user characteristic may include: determining the user characteristic to which a minimum value of the one or more first evaluation values in the first user profile corresponds as the second target user characteristic. Thus, targeted recommendation can be made for the shortcoming characteristic in the first user profile.

Optionally, the matching model may employ one or more machine learning models such as neural networks, decision trees and classifiers.

According to actual application requirements, a structure of the matching model and a type of input and output may be set. The trained matching model can be used to calculate the matching value of the selectable object and the first user profile.

In an implementation manner, a matching value for each selectable object output by the matching model can be obtained by inputting the user characteristic vector into the matching model.

In another implementation manner, for each selectable object of the plurality of selectable objects, an object characteristic vector corresponding to the selectable object can be determined. By inputting the user characteristic vector and the object characteristic vector corresponding to the selectable object into the matching model, a matching value corresponding to the selectable object output by the matching model can be obtained.

After the recommended object is determined, the step S203 may be performed, and the recommended object is recommended to the user.

Optionally, object recommendation may be performed in various ways of sending the recommended object to the user, or sending information related to a link, identification, or the like of the recommended object to the user, etc., which is not limited herein.

After the recommended object is recommended to the user, the step S204 may be performed, and a second user profile of the user is obtained, wherein the second user profile is determined based on behavior data of the user over a second historical period of time, and the behavior data over the second historical period of time includes behavior data after the recommended object is recommended to the user. Thus, the user profile may be updated according to the behavior data of the user after the recommendation is performed for the user.

According to some embodiments, the second user profile of the user may be obtained in response to determining that a duration after the recommended object is recommended to the user is greater than a preset duration.

In an implementation manner, the preset duration may be a learning cycle of the user. The duration after the recommended object is recommended to the user is greater than the preset duration, which indicates that the learning cycle has passed away from recommendation of the recommended object to the user, and the second user profile of the user should be obtained, and thereby, the learning effect of the user can be evaluated.

According to some embodiments, the second user profile may include one or more user characteristics and one or more second evaluation values respectively corresponding thereto, wherein, the one or more user characteristics in the second user profile may be the same as the one or more user characteristics in the first user profile, and thus, changes of each user characteristic before and after the object recommendation is performed can be analyzed.

It may be understood that the manner in which the second user profile is obtained may be the same as the manner in which the first user profile is obtained, which will not be described herein.

For the step S205, the matching model may be updated based on the first user profile, the second user profile and the recommended object.

According to some embodiments, the matching model may be updated based on a difference between the first user profile and the second user profile. According to the difference between the first user profile and the second user profile (i.e., the difference between the user profiles before and after the object is recommended to the user), the recommendation effect of the recommended object can be evaluated, thereby pointedly adjusting the matching value between the first user profile and the recommended object.

In an implementation manner, when the difference between the first user profile and the second user profile accords with an expectation, it is stated that the recommended object recommended by the matching model based on the first user profile is effective, and thus, the matching model should be kept unchanged, or the matching model should be updated so that the matching value between the first user profile and the recommended object is increased; when the difference between the first user profile and the second user profile does not accord with the expectation, it is stated that the recommended object recommended by the matching model based on the first user profile is ineffective or less effective, and thus, the matching model should be updated so that the matching value between the first user profile and the recommended object is reduced.

According to some embodiments, under the condition that the matching model includes a relevance model, based on the first user profile, the second user profile and the recommended object, updating the matching model may include: updating the matching model to adjust the relevance value (e.g., similarity value) of the recommended object and the first target user characteristic based on the first evaluation value corresponding to the first target user characteristic in the first user profile and the second evaluation value corresponding to the first target user characteristic in the second user profile. Thereby, dynamic update of the relevance model in the process of application can be achieved.

According to some embodiments, the relevance value of the recommended object and the first target user characteristic may be updated according to the recommendation effect of the recommended object, and the computational rules of the relevance model may be reversely corrected based on the updated relevance value.

In an implementation manner, the relevance value between the first target user characteristic and the recommended object can be increased or remain unchanged under the condition that the difference between the first evaluation value and the second evaluation value corresponding to the first target user characteristic accords with the expectation; and under the condition that the difference between the first evaluation value and the second evaluation value corresponding to the first target user characteristic does not accord with the expectation, the relevance value between the first target user characteristic and the recommended object may be decreased correspondingly.

In another implementation manner, under the condition that the expectation is an increase of the evaluation values corresponding to the first target user characteristic, an expectation threshold $\tau$ may be preset and a correction parameter $\alpha$ is calculated on this basis.

$$\alpha = t_2 - t_1 - \tau$$

Wherein, $0<\tau<T$, T represents a maximum value in a value range of the evaluation value (including the first evaluation value and the second evaluation value), $t_2$ represents the second evaluation value corresponding to the first target user characteristic, and $t_1$ represents the first evaluation value corresponding to the first target user characteristic.

Based on the correction parameter $\alpha$ obtained by calculation, a weighted sum of the relevance value of the first target user characteristic and the recommended object and a normalized result of the correction parameter $\alpha$ can be taken as an updated relevance value. Wherein, when the first target user characteristic includes a plurality of user characteristics, a weighted sum of sub-correction parameters of the various user characteristics may be taken as the correction parameter.

Understandably, the normalized calculation of the correction parameter $\alpha$ may be achieved by a number of calculation means including a sigmoid function, which is not limited herein.

It may be understood that the above implementation manner is only an example embodiment, and other methods may also be employed to update the relevance value of the first target user characteristic and the recommended object by the first evaluation value and the second evaluation value.

Based on the updated relevance value, the computational rules of the relevance model may be corrected, thereby achieving update of the relevance model.

According to some embodiments, under the condition that the relevance model includes a calculation module and a correction module, by an initial relevance value l calculated by the calculation module and a correction constant m stored in the correction module, a relevance value q of the selectable object and the first target user characteristic may be determined, i.e., $q = l + \mu m$, wherein $\mu$ represents the correction coefficient of the relevance model, $-1 \leq \mu \leq 1$. The correction coefficient $\mu$ in the relevance model may be updated according to the recommendation effect of the recommended object, thereby adjusting the relevance value of the recommended object and the first target user characteristic.

In an implementation manner, the correction coefficient μ may be adjusted based on the above determined correction parameter α.

It may be understood that other methods may also be employed to correct the correction coefficient μ in the relevance model by the first evaluation value and the second evaluation value, which are not limited herein.

According to some embodiments, based on the first user profile, the second user profile and the recommended object, updating the matching model can include: determining a matching value label corresponding to the user characteristic vector and the recommended object based on the first evaluation value corresponding to the second target user characteristic in the first user profile and the second evaluation value corresponding to the second target user characteristic in the second user profile; and training the matching model by using the user characteristic vector and the matching value label as training data. Thus, a machine learning matching model may be further trained in the process of application to continuously promote the matching effect of the matching model.

In an implementation manner, under the condition that the difference between the first evaluation value and the second evaluation value corresponding to the second target user characteristic accords with the expectation, the matching value label corresponding to the user characteristic vector and the recommended object can be set to be a larger value in a value range of the matching value; and under the condition that the difference between the first evaluation value and the second evaluation value corresponding to the second target user characteristic does not accord with the expectation, the matching value label corresponding to the user characteristic vector and the recommended object can be set to be a smaller value in the value range of the matching value. For example, when the value range of the matching value is 0~1, the matching value label may be set to be 1 under the condition that the difference between the first evaluation value and the second evaluation value corresponding to the second target user characteristic accords with the expectation, and the matching value label may be set to be 0 under the condition that the difference between the first evaluation value and the second evaluation value corresponding to the second target user characteristic does not accord with the expectation.

In an implementation manner, under the condition that the expectation is an increase of the evaluation values corresponding to the second target user characteristic, an increase threshold ρ may be preset and a correction parameter β is calculated on this basis.

$$\beta = p_2 - p_1 - \rho$$

Wherein, $0 < \rho < P$, and P represents a maximum value in a value range of the evaluation value (including the first evaluation value and the second evaluation value), and $p_2$ represents the second evaluation value to which the second target user characteristic corresponds, and $p_1$ represents the first evaluation value to which the second target user characteristic corresponds.

Thereby, a normalized result of the correction parameter β may be taken as a matching value label.

Understandably the normalized calculation of the correction parameter β may be achieved by a number of calculation means including a sigmoid function, which is not limited herein.

It may be understood that the above implementation manner is only an example embodiment, and other methods may also be employed to determine a matching value label of the user characteristic vector and the recommended object by the first evaluation value and the second evaluation value, and the matching model is trained based on this.

Figure 3:
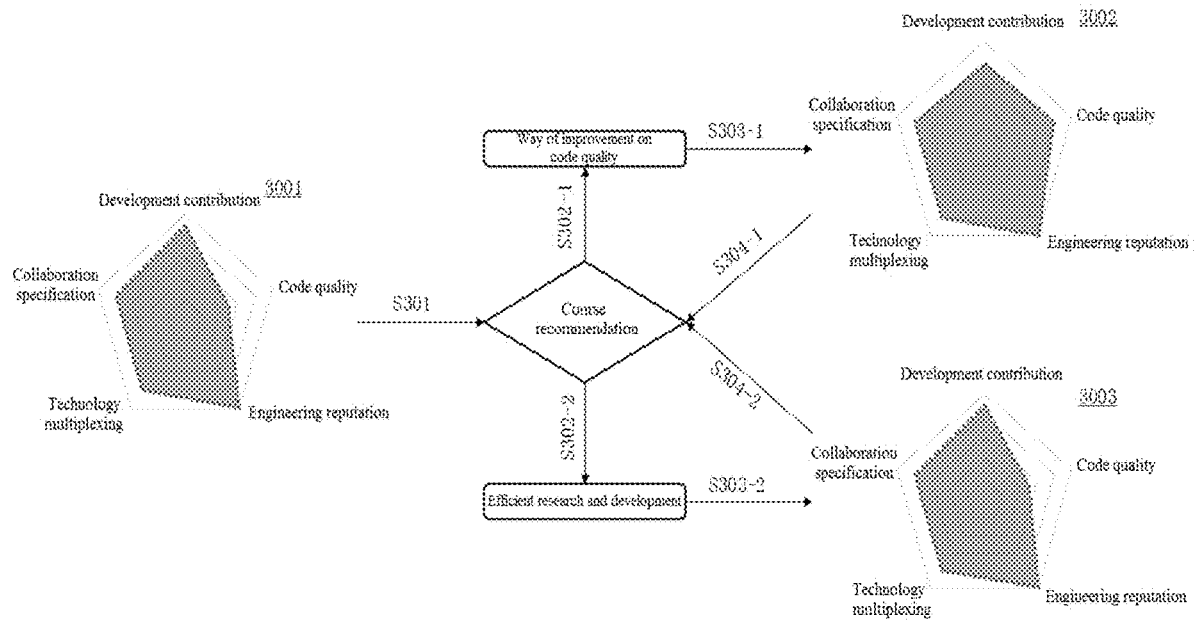
FIG. 3 is a flowchart illustrating a recommendation of an engineer training course according to an example embodiment of the present disclosure.

In a specific embodiment as shown in FIG. 3, the user to which the object recommendation method is directed may be an engineer (i.e., user) participating in software development or project development. Through a course recommendation matching model, a training course (i.e., object) that matches his/her personal working ability can be recommended to the engineer.

Behavior data of the engineer over the first historical period of time is collected by a program compilation platform, the behavior data may include code data, execution of code reviews, and other multiple behavior data submitted by the engineer. It can be understood that the behavior data of engineer in daily work can be automatically collected by the system, and the engineer does not need to actively provide the own behavior data.

Based on the collected behavior data over the first historical period of time, a first user profile 3001 of the engineer as shown in FIG. 3 may be constructed, for example as may be described in the step S201.

Specifically, the first user profile 3001 may include user characteristics for evaluating engineer' abilities in various aspects, for example, may include development contribution, code quality, engineering reputation, technology multiplexing, and collaboration specification, wherein the development contribution is used to represent the contribution made by the engineer to the development and review of a code base. The code quality is used to represent the validity of codes submitted by the engineer. The engineering reputation is used to represent whether there is a cheat in project evaluation. The technical multiplexing represents a comprehensive use ability of different technologies by the engineer. The collaboration specification represents the ability of the engineer to work collaboratively with others. Meanwhile, the first user profile also includes first evaluation values corresponding to the development contribution, the code quality, the engineering reputation, the technical multiplexing and the collaboration specification, respectively.

As shown in the first user profile 3001 in FIG. 3, the first evaluation value of the user characteristic of the code quality of the engineer is low, and the code quality can be taken as the target user characteristic.

For the target user characteristic of the code quality, in a step S301, by using the course recommendation matching model, a recommended course (i.e., object) corresponding to the first user profile 3001 may be determined, for example may be as described in the step S202.

Under a condition, the course recommendation matching model recommends a training course of Way Of Improvement on Code Quality to the user in step S302-1, for example, may be as described in the step S203. After a predetermined school duration has passed, based on the behavior data of the user over the second historical period of time, a second user profile 3002 may be constructed in a step S303-1, for example, may be as described in the step S204. As shown in FIG. 3, in the second user profile 3002, the code quality of the target user characteristic is effectively promoted, and thus, the course recommendation matching model is updated correspondingly in a step S304-1, for example, may be as described in the step S205, to improve the matching value between the target user characteristic and the training course (Way Of Improvement on Code Quality).

Under another condition, the course recommendation matching model recommends a training course of efficient Research and development to the user in a step S302-2, for example, may be as described in the step S203. After a predetermined school duration has passed, based on the behavior data of the user over the second historical period of time, a second user profile 3003 may be constructed in a step S303-2, for example, may be as described in the step S204. As shown in FIG. 3, in the second user profile 3003, the target user characteristic (code quality) is not effectively improved, and thus, the course recommendation matching model is updated correspondingly in a step S304-2, for example, may be as described in the step S205 to decrease the matching value between the target user characteristic and the training course (Efficient Research and Development).

Thus, updates and promotions to the course recommendation model may be implemented in the process of use of the course recommendation model.

Figure 4:
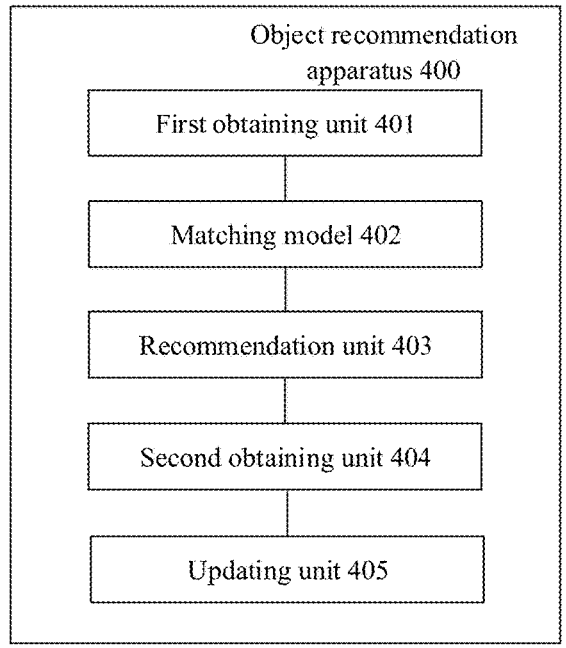
FIG. 4 is a block diagram illustrating an object recommendation apparatus according to an example embodiment of the present disclosure.

According to another method of the present disclosure, as shown in FIG. 4, an object recommendation apparatus 400 is also provided, and the apparatus 400 includes: a first obtaining unit 401, configured to obtain a first user profile of a user, wherein the first user profile is determined based on behavior data of the user over a first historical period of time; a matching model 402, configured to determine a recommended object based on the first user profile; a recommendation unit 403, configured to recommend the recommended object to the user; a second obtaining unit 404, configured to obtain a second user profile of the user, wherein the second user profile is determined based on behavior data of the user over a second historical period of time, and the behavior data over the second historical period of time includes behavior data after the recommended object is recommended to the user; and an updating unit 405, configured to update the matching model based on the first user profile, the second user profile and the recommended object.

According to some embodiments, the updating unit includes a first updating subunit configured to update the matching model based on a difference between the first user profile and the second user profile.

According to some embodiments, the matching model includes: a first determining unit, configured to determine a matching value of each selectable object of a plurality of selectable objects and the first user profile, respectively; and a second determining unit, configured to determine at least one of the plurality of selectable objects as a recommended object corresponding to the first user profile based on the matching value of each selectable object and the first user profile.

According to some embodiments, the first user profile includes one or more user characteristics and one or more first evaluation values respectively corresponding thereto, and the second user profile includes one or more user characteristics and one or more second evaluation values respectively corresponding thereto.

According to some embodiments, the matching model includes a relevance model, and the first determining unit includes: a first determining subunit, configured to determine at least one user characteristic in the first user profile as a first target user characteristic; and a second determining subunit, configured to, for each selectable object of the plurality of selectable objects, use the relevance model to determine a relevance value of the selectable object and the first target user characteristic, and determine the relevance value as a matching value of the selectable object and the first user profile.

According to some embodiments, the updating unit includes: a second updating subunit, configured to update the matching model based on a first evaluation value corresponding to a first target user characteristic in the first user profile and a second evaluation value corresponding to the first target user characteristic in the second user profile to adjust a relevance value of the recommended object and the first target user characteristic.

According to some embodiments, the first determining unit includes: a constructing subunit, configured to construct a user characteristic vector corresponding to the first user profile based on the one or more first evaluation values; and an output subunit, configured to, for each selectable object of the plurality of selectable objects, in response to the user characteristic vector being input to the matching model, output a matching value of the selectable object and the first user profile by the matching model.

According to some embodiments, the updating unit includes: a third determining unit, configured to determine a matching value label corresponding to the user characteristic vector and the recommended object based on at least one of the one or more first evaluation values included by the first user profile and at least one of the one or more second evaluation values included by the second user profile; and a training unit, configured to train the matching model by using the user characteristic vector and the matching value label corresponding to the first user profile as training data.

According to another aspect of the present disclosure, a computer device is further provided, and includes: a memory, a processor and a computer program stored on the memory, wherein the processor is configured to execute the computer program to implement the actions of the above method.

According to another aspect of the present disclosure, a non-transitory computer-readable storage medium is further provided and has a computer program stored thereon, wherein the computer program, when executed by a processor, implements the actions of the above method.

According to another aspect of the present disclosure, a computer program product is further provided, and includes a computer program, wherein the computer program, when executed by a processor, implements the actions of the above method.

Figure 5:
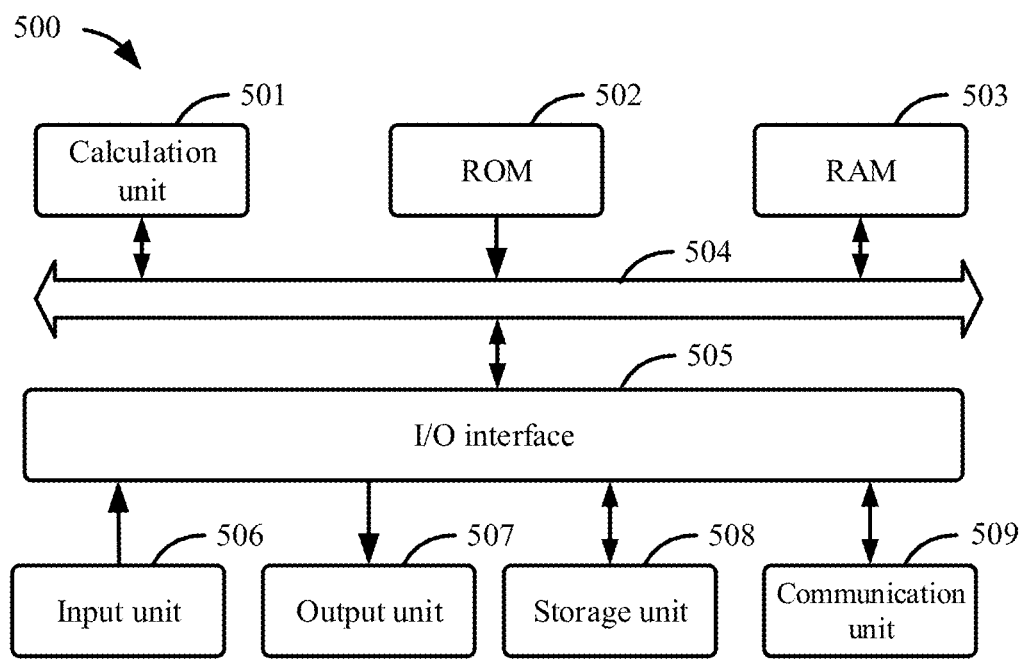
FIG. 5 is a structural block diagram illustrating an example electronic device that can be used to implement embodiments of the present disclosure.

Referring to FIG. 5, a structural block diagram of an electronic device 500 that can serve as a server or a client of the present disclosure is described now, which is an example of a hardware device that can be applied in various aspects of the present disclosure. Electronic devices are intended to represent various forms of digital electronic computer devices, such as laptops, desktops, workstations, personal digital assistants, servers, blade servers, mainframe computers, and other appropriate computers. The electronic devices may also represent various forms of mobile devices, such as personal digital processing, cellular telephones, smartphones, wearable devices, and other similar computing devices. Components, their connections and relationships, and their functions, as shown herein, serve as examples only, and are not meant to limit implementations of the present disclosure described and/or claimed herein.

As shown in FIG. 5, the device 500 includes a calculation unit 501 which can perform various suitable actions and processing in accordance with a computer program stored in a Read Only Memory (ROM) 502 or a computer program loaded from a storage unit 508 into a Random Access Memory (RAM) 503. In the RAM 503, various programs and data necessary for the operation of the device 500 may also be stored. The calculation unit 501, the ROM 502 and the RAM 503 are connected to each other by a bus 504. An Input/Output (I/O) interface 505 is also connected to the bus 504.

A plurality of components in the device 500 are connected to the I/O interface 505, including an input unit 506, an output unit 507, a storage unit 508 and a communication unit 509. The input unit 506 can be any type of device capable of inputting information to the device 500, the input unit 506 may receive input numeric or character information and generate key signal input related to user setting and/or function control of the electronic device, and may include, but is not limited to, a mouse, a keyboard, a touch screen, a track pad, a trackball, a joystick, a microphone, and/or a remote controller. The output unit 507 may be any type of device capable of presenting information and may include, but is not limited to, a display, a speaker, a video/audio output terminal, a vibrator, and/or a printer. The storage unit 508 may include, but is not limited to, a magnetic disk and an optical disk. The communication unit 509 allows the device 500 to exchange information/data with other devices via a computer network such as Internet and/or various telecommunication networks, and may include, but is not limited to, a modem, a network card, an infrared communication device, a wireless communication transceiver, and/or a chipset, such as a Bluetooth™ device, a 802.11 device, a WiFi device, a WiMax device, a cellular communication device, and/or the like.

The calculation unit 501 can be various general and/or special purpose processing components with processing and computing capabilities. Some examples of the calculation unit 501 include, but are not limited to, a Central Processing Unit (CPU), a Graphics Processing Unit (GPU), various specialized Artificial Intelligence (AI) computing chips, various computation units running machine learning model algorithms, a Digital Signal Processor (DSP), and any suitable processor, controller, microcontroller, etc. The calculation unit 501 executes the above various methods and processing, such as the object recommendation method. For example, in some embodiments, the object recommendation method may be implemented as a computer software program tangibly contained in a machine-readable medium, such as the storage unit 508. In some embodiments, a part or all of the computer program may be loaded and/or installed on the device 500 via the ROM 502 and/or the communication unit 509. When the computer program is loaded into the RAM 503 and executed by the calculation unit 501, one or more steps of the object recommendation method described above may be performed. Alternatively, in other embodiments, the calculation unit 501 may be configured in any other suitable manner (e.g., by means of firmware) to perform the object recommendation method.

Various implementation manners of the systems and techniques described above herein can be realized in a digital electronic circuitry system, an integrated circuit system, a Field Programmable Gate Array (FPGA), an Application Specific Integrated Circuit (ASIC), an Application Specific Standard Product (ASSP), a System-on-Chip system (SOC), a Complex Programmable Logic Device (CPLD), computer hardware, firmware, software, and/or combinations thereof. These various implementation manners may include: implementing in one or more computer programs, wherein the one or more computer programs can be executed and/or interpreted on a programmable system including at least one programmable processor, and the programmable processor can be a special or general purpose programmable processor that can receive data and instructions from a storage system, at least one input device, and at least one output device, and transmit the data and the instructions to the storage system, the at least one input device, and the at least one output device.

The program codes for implementing the method of the present disclosure may be compiled in any combination of one or more programming languages. These program codes may be provided for a processor or controller of a general purpose computer, a special purpose computer, or other programmable data processing apparatuses, such that the program codes, when executed by the processor or controller, cause the functions/operations specified in the flowcharts and/or block diagrams to be implemented. The program codes may be executed entirely on the machine, partly on the machine, as a stand-alone software package partly on the machine and partly on a remote machine or entirely on the remote machine or server.

In the context of the present disclosure, a machine readable medium may be a tangible medium that can contain, or store a program for use by or in combination with an instruction execution system, apparatus, or device. The machine readable medium may be a machine readable signal medium or a machine readable storage medium. The machine readable medium may include, but be not limited to, an electronic, magnetic, optical, electromagnetic, infrared, or semiconductor system, apparatus, or device, or any suitable combination of the foregoing. A more specific example of a machine-readable storage medium would include an electrical connection based on one or more wires, a portable computer disk, a hard disk, a Random Access Memory (RAM), a Read Only Memory (ROM), an Erasable Programmable Read Only Memory (EPROM or Flash memory), an optical fiber, a portable Compact Disc Read Only Memory (CD-ROM), an optical storage device, a magnetic storage device, or any suitable combination of the foregoing.

To provide for interaction with a user, the systems and techniques described herein can be implemented on a computer having a display device (e.g., a CRT (Cathode Ray Tube) or an LCD (Liquid Crystal Display) monitor) for displaying information to the user; and a keyboard and a pointing device (e.g., a mouse or a trackball), by which the user can provide input for the computer. Other types of devices can be used to provide interaction with a user as well; for example, feedback provided for the user can be any form of sensory feedback (e.g., visual feedback, auditory feedback, or tactile feedback); and input from the user can be received in any form (including acoustic, speech, or tactile input).

The systems and techniques described herein can be implemented in a computing system including a background component (e.g., as a data server), or a computing system including a middleware component (e.g., an application server), or a computing system including a front end component (e.g., a user computer having a graphical user interface or a web browser through which a user can interact with implementation manners of the systems and techniques described herein), or a computing system including any combination of such background component, middleware, or front end component. The components of the system can be interconnected by any form or medium of digital data communication (e.g., a communication network). Examples of the communication network include a Local Area Network (LAN), a Wide Area Network (WAN), and Internet.

The computer system can include a client and a server. The client and server are generally remote from each other and generally interact through a communication network. The relationship of the client and the server is produced by virtue of computer programs running on corresponding computers and having a mutual client-server relationship.

It should be understood that steps can be reordered, added, or deleted by using the various forms of flows shown above. For example, the steps described in the present disclosure may be performed concurrently, sequentially or in a different order, so long as the desired results of the technical solutions disclosed in the present disclosure can be achieved, which is not limited herein.

Although the embodiments or examples of the present disclosure have been described with reference to the accompanying drawings, it should be understood that the above methods, systems and devices are merely example embodiments or examples, and that the scope of the present disclosure is not limited by these embodiments or examples, but is only limited by the authorized claims and equivalents thereof. Various elements in the embodiments or examples may be omitted or may be replaced by equivalent elements thereof. Furthermore, steps may be performed in a different order than described in the present disclosure. Further, various elements of an embodiment or example may be combined in various ways. Importantly, as technology evolves, a plurality of elements described herein may be replaced by equivalent elements that appear after the disclosure.

What is claimed is:

1. A method for object recommendation, the method comprising:
    obtaining a first user profile of a user, wherein the first user profile is based on behavior data of the user over a first historical period of time;
    using a matching model to determine a recommended object based on the first user profile, wherein using the matching model to determine the recommended object based on the first user profile comprises:
        using the matching model to determine a matching value of each selectable object of a plurality of selectable objects and the first user profile, respectively; and
        determining at least one selectable object of the plurality of selectable objects as the recommended object corresponding to the first user profile based on the matching value of each selectable object of the plurality of selectable objects and the first user profile;
    recommending the recommended object to the user;
    obtaining a second user profile of the user, wherein the second user profile is based on behavior data of the user over a second historical period of time, wherein the behavior data of the user over the second historical period of time comprises behavior data of the user after recommending the recommended object to the user; and
    updating the matching model based on the first user profile, the second user profile, and the recommended object.

2. The method according to claim 1, wherein updating the matching model based on the first user profile, the second user profile, and the recommended object comprises:
    updating the matching model based on a difference between the first user profile and the second user profile.

3. The method according to claim 1, wherein the first user profile comprises one or more user characteristics and one or more first evaluation values respectively corresponding to the one or more user characteristics, and wherein the second user profile comprises the one or more user characteristics and one or more second evaluation values respectively corresponding to the one or more user characteristics.

4. The method according to claim 3, wherein the matching model comprises a relevance model, and using the matching model to determine the matching value of each selectable object of the plurality of selectable objects and the first user profile, respectively comprises:
    determining at least one user characteristic in the first user profile as a first target user characteristic; and
    for each selectable object of the plurality of selectable objects, using the relevance model to determine a relevance value of the selectable object and the first target user characteristic, and determining the relevance value as the matching value of the selectable object and the first user profile.

5. The method according to claim 4, wherein determining the at least one user characteristic in the first user profile as the first target user characteristic comprises:
    determining a user characteristic having a minimum value of the one or more first evaluation values in the first user profile as the first target user characteristic.

6. The method according to claim 4, wherein updating the matching model based on the first user profile, the second user profile, and the recommended object comprises:
    updating the matching model based on a first evaluation value corresponding to the first target user characteristic in the first user profile and a second evaluation value corresponding to the first target user characteristic in the second user profile to adjust a relevance value of the recommended object and the first target user characteristic.

7. The method according to claim 3, wherein using the matching model to determine the matching value of each selectable object of the plurality of selectable objects and the first user profile, respectively comprises:
    determining at least one user characteristic in the first user profile as a second target user characteristic;
    constructing a user characteristic vector based on at least one first evaluation value corresponding to the second target user characteristic; and
    for each selectable object of the plurality of selectable objects, in response to the user characteristic vector being input to the matching model, obtaining the matching value of the selectable object and the first user profile output by the matching model.

8. The method according to claim 7, wherein updating the matching model based on the first user profile, the second user profile, and the recommended object comprises:
    determining a matching value label corresponding to the user characteristic vector and the recommended object based on a first evaluation value corresponding to the second target user characteristic in the first user profile and a second evaluation value corresponding to the second target user characteristic in the second user profile; and
    training the matching model by using the user characteristic vector and the matching value label as training data.

9. A computing device, comprising:
    a processor, and
    a memory that stores a program, the program comprising instructions that, when executed by the processor, cause the processor to perform actions including:
        obtaining a first user profile of a user, wherein the first user profile is based on behavior data of the user over a first historical period of time;

using a matching model to determine a recommended object based on the first user profile, wherein using the matching model to determine the recommended object based on the first user profile comprises:
    using the matching model to determine a matching value of each selectable object of a plurality of selectable objects and the first user profile, respectively; and
    determining at least one selectable object of the plurality of selectable objects as the recommended object corresponding to the first user profile based on the matching value of each selectable object of the plurality of selectable objects and the first user profile;
recommending the recommended object to the user;
obtaining a second user profile of the user, wherein the second user profile is based on behavior data of the user over a second historical period of time, wherein the behavior data of the user over the second historical period of time comprises behavior data of the user after recommending the recommended object to the user; and
updating the matching model based on the first user profile, the second user profile and the recommended object.

10. The computing device according to claim 9, wherein updating the matching model based on the first user profile, the second user profile, and the recommended object comprises:
updating the matching model based on a difference between the first user profile and the second user profile.

11. The computing device according to claim 9, wherein the first user profile comprises one or more user characteristics and one or more first evaluation values respectively corresponding to the one or more user characteristics, and the second user profile comprises the one or more user characteristics and one or more second evaluation values respectively corresponding to the one or more user characteristics.

12. The computing device according to claim 11, wherein the matching model comprises a relevance model, and using the matching model to determine the matching value of each selectable object of the plurality of selectable objects and the first user profile, respectively comprises:
determining at least one user characteristic in the first user profile as a first target user characteristic; and
for each selectable object of the plurality of selectable objects, using the relevance model to determine a relevance value of the selectable object and the first target user characteristic, and determining the relevance value as the matching value of the selectable object and the first user profile.

13. The computing device according to claim 12, wherein determining the at least one user characteristic in the first user profile as the first target user characteristic comprises:
determining a user characteristic having a minimum value of the one or more first evaluation values in the first user profile as the first target user characteristic.

14. The computing device according to claim 12, wherein updating the matching model based on the first user profile, the second user profile, and the recommended object comprises:
updating the matching model based on a first evaluation value corresponding to the first target user characteristic in the first user profile and a second evaluation value corresponding to the first target user characteristic in the second user profile to adjust a relevance value of the recommended object and the first target user characteristic.

15. The computing device according to claim 11, wherein using the matching model to determine the matching value of each selectable object of the plurality of selectable objects and the first user profile, respectively comprises:
determining at least one user characteristic in the first user profile as a second target user characteristic;
constructing a user characteristic vector based on at least one first evaluation value corresponding to the second target user characteristic; and
for each selectable object of the plurality of selectable objects, in response to the user characteristic vector being input to the matching model, obtaining the matching value of the selectable object and the first user profile output by the matching model.

16. The computing device according to claim 15, wherein updating the matching model based on the first user profile, the second user profile, and the recommended object comprises:
determining a matching value label corresponding to the user characteristic vector and the recommended object based on a first evaluation value corresponding to the second target user characteristic in the first user profile and a second evaluation value corresponding to the second target user characteristic in the second user profile; and
training the matching model by using the user characteristic vector and the matching value label as training data.

17. A non-transitory computer-readable storage medium having a computer program stored thereon, wherein the computer program, when executed by a processor, causes the processor to perform actions including:
obtaining a first user profile of a user, wherein the first user profile is based on behavior data of the user over a first historical period of time;
using a matching model to determine a recommended object based on the first user profile, wherein using the matching model to determine the recommended object based on the first user profile comprises:
    using the matching model to determine a matching value of each selectable object of a plurality of selectable objects and the first user profile, respectively; and
    determining at least one selectable object of the plurality of selectable objects as the recommended object corresponding to the first user profile based on the matching value of each selectable object of the plurality of selectable objects and the first user profile;
recommending the recommended object to the user;
obtaining a second user profile of the user, wherein the second user profile is based on behavior data of the user over a second historical period of time, wherein the behavior data of the user over the second historical period of time comprises behavior data of the user after recommending the recommended object to the user; and
updating the matching model based on the first user profile, the second user profile and the recommended object.

18. The non-transitory computer-readable storage medium according to 17, wherein updating the matching model based on the first user profile, the second user profile, and the recommended object comprises:

updating the matching model based on a difference between the first user profile and the second user profile.

* * * * *